United States Patent
Deng et al.

(10) Patent No.: US 10,636,205 B2
(45) Date of Patent: Apr. 28, 2020

(54) SYSTEMS AND METHODS FOR OUTLIER EDGE REJECTION

(71) Applicant: QUALCOMM Incorporated, San Diego, CA (US)

(72) Inventors: Yan Deng, San Diego, CA (US); Michel Adib Sarkis, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 15/863,434

(22) Filed: Jan. 5, 2018

(65) Prior Publication Data
US 2019/0213787 A1   Jul. 11, 2019

(51) Int. Cl.
| | |
|---|---|
| *G06T 7/13* | (2017.01) |
| *G06T 17/20* | (2006.01) |
| *G06T 15/40* | (2011.01) |
| *G06T 7/162* | (2017.01) |
| *G06T 7/136* | (2017.01) |
| *G06T 7/543* | (2017.01) |
| *G06T 17/00* | (2006.01) |

(52) U.S. Cl.
CPC .............. *G06T 17/20* (2013.01); *G06T 7/13* (2017.01); *G06T 7/136* (2017.01); *G06T 7/162* (2017.01); *G06T 7/543* (2017.01); *G06T 15/40* (2013.01); *G06T 17/00* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 9,036,044 B1 | 5/2015 | Bae et al. | |
| 9,135,396 B1* | 9/2015 | Kalinin | G06F 16/285 |
| 2012/0300979 A1 | 11/2012 | Pirchheim et al. | |
| 2013/0034277 A1* | 2/2013 | Cecchi | G06F 19/321 |
| | | | 382/128 |
| 2015/0293994 A1* | 10/2015 | Kelly | H04L 41/12 |
| | | | 707/740 |
| 2016/0154408 A1 | 6/2016 | Eade et al. | |
| 2017/0180644 A1 | 6/2017 | Alibay et al. | |

OTHER PUBLICATIONS

Yogeswaran A., et al., "3D Surface Analysis for Automated Detection of Deformations on Automotive Body Panels", Intech Open Science, Open Mind, 2012, 31 pages.

* cited by examiner

*Primary Examiner* — Said Broome
(74) *Attorney, Agent, or Firm* — Austin Rapp & Hardman, P.C.

(57) ABSTRACT

A method performed by an electronic device is described. The method includes incrementally adding a current node to a graph. The method also includes incrementally determining a respective adaptive edge threshold for each candidate edge between the current node and one or more candidate neighbor nodes. The method further includes determining whether to accept or reject each candidate edge based on each respective adaptive edge threshold. The method additionally includes performing refining based on the graph to produce refined data. The method also includes producing a three-dimensional (3D) model based on the refined data.

26 Claims, 11 Drawing Sheets

Mesh A 442

Mesh B 444

SYSTEMS AND METHODS FOR OUTLIER EDGE REJECTION

FIELD OF DISCLOSURE

The present disclosure relates generally to electronic devices. More specifically, the present disclosure relates to systems and methods for outlier edge rejection.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, healthcare equipment, set-top boxes, etc.) capture and/or utilize sensor data. For example, a smart phone may capture and/or process still and/or video images. Processing sensor data may demand a relatively large amount of time, memory, and energy resources. The resources demanded may vary in accordance with the complexity of the processing.

In some cases, sensor data may be noisy and/or may exhibit inaccuracies. For example, some sensor data may suffer from low signal-to-noise ratio (SNR) and/or drift. As can be observed from this discussion, systems and methods that improve sensor data processing may be beneficial.

SUMMARY

A method performed by an electronic device is described. The method includes incrementally adding a current node to a graph. The method also includes incrementally determining a respective adaptive edge threshold for each candidate edge between the current node and one or more candidate neighbor nodes. The method further includes determining whether to accept or reject each candidate edge based on each respective adaptive edge threshold. The method additionally includes performing refining based on the graph to produce refined data. The method also includes producing a three-dimensional (3D) model based on the refined data. Producing the 3D model may include utilizing multiple image frames to produce a mesh model based on the refined data.

The method may include determining a respective similarity measure between the current node and each of the one or more candidate neighbor nodes. Determining whether to accept or reject each candidate edge may include, for each candidate edge, accepting a candidate edge in a case that a corresponding similarity measure is greater than or equal to the respective adaptive edge threshold and rejecting the candidate edge in a case that the corresponding similarity measure is less than the respective adaptive edge threshold. Accepting a candidate edge may include associating the current node with a candidate neighbor node using the candidate edge.

Determining each adaptive edge threshold may be based on a cumulative similarity measure of one or more similarity measures. Determining an adaptive edge threshold may include determining an incremental mean based on a cumulative similarity measure. Determining the adaptive edge threshold may also include determining an annealing term based on the incremental mean and a similarity measure. Determining the adaptive edge threshold may further include determining the adaptive edge threshold based on the incremental mean and the annealing term.

The method may include determining an incremental standard deviation. Determining the adaptive edge threshold may be further based on the incremental standard deviation.

The method may include incrementally obtaining key frames. Each of the key frames may have an associated three-dimensional (3D) pose. Each of the current node and the one or more candidate neighbor nodes may correspond to one of the key frames with the associated 3D pose.

An electronic device is also described. The electronic device includes a memory. The electronic device also includes a processor coupled to the memory. The processor is configured to incrementally add a current node to a graph. The processor is also configured to incrementally determine a respective adaptive edge threshold for each candidate edge between the current node and one or more candidate neighbor nodes. The processor is further configured to determine whether to accept or reject each candidate edge based on each respective adaptive edge threshold. The processor is additionally configured to perform refining based on the graph to produce refined data. The processor is also configured to produce a three-dimensional (3D) model based on the refined data.

A non-transitory tangible computer-readable medium storing computer executable code is also described. The computer-readable medium includes code for causing an electronic device to incrementally add a current node to a graph. The computer-readable medium also includes code for causing the electronic device to incrementally determine a respective adaptive edge threshold for each candidate edge between the current node and one or more candidate neighbor nodes. The computer-readable medium further includes code for causing the electronic device to determine whether to accept or reject each candidate edge based on each respective adaptive edge threshold. The computer-readable medium additionally includes code for causing the electronic device to perform refining based on the graph to produce refined data. The computer-readable medium also includes code for causing the electronic device to produce a three-dimensional (3D) model based on the refined data.

An apparatus is also described. The apparatus includes means for incrementally adding a current node to a graph. The apparatus also includes means for incrementally determining a respective adaptive edge threshold for each candidate edge between the current node and one or more candidate neighbor nodes. The apparatus further includes means for determining whether to accept or reject each candidate edge based on each respective adaptive edge threshold. The apparatus additionally includes means for performing refining based on the graph to produce refined data. The apparatus also includes means for producing a three-dimensional (3D) model based on the refined data.

DETAILED DESCRIPTION

Some configurations of the systems and methods disclosed herein may be implemented in order to produce a three-dimensional (3D) model of an environment (e.g., one or more objects). For example, several image frames with corresponding poses may be captured in the environment in order to generate a 3D model of the environment. The image frames and/or poses may be subject to noise. For instance, image frames may be captured with non-uniform lighting and/or poses may be captured with drift. The noise may reduce accuracy in generating the 3D model.

In order to improve 3D modeling accuracy, the image frames and poses may be represented in a graph. A graph may be a structure that includes one or more nodes. A node is a mathematical abstraction that may be defined differently based on the application. In some configurations of the systems and methods disclosed herein, for example, each node in a graph may correspond to or represent a frame with a pose (e.g., associated 3D pose). For instance, the frame may be a frame of image data, depth image data, thermal image data, etc. The pose may indicate pose data (e.g., position and/or orientation) of a sensor that captured the frame.

Nodes in a graph may be connected by an edge. An edge may indicate that the two connected nodes are related. For example, an edge may indicate that two connected nodes are related with a degree of similarity. Determining which nodes to connect with an edge may be challenging, since the distribution of similarity between image frames may be dependent on the image frames under consideration.

Some configurations of the systems and methods disclosed herein may relate to data adaptive outlier edge rejection (for bundle adjustment, for example). For instance, a pair of image frames may be dissimilar to a degree that they should not be considered similar enough to be connected by an edge. Such edges may be referred to as outlier edges and may be rejected in a graph. Other edges between similar image frames may be accepted (e.g., used to connect corresponding nodes). Accurately determining edges in a graph may improve error minimization in the pose data, which may lead to improved accuracy in 3D modeling.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
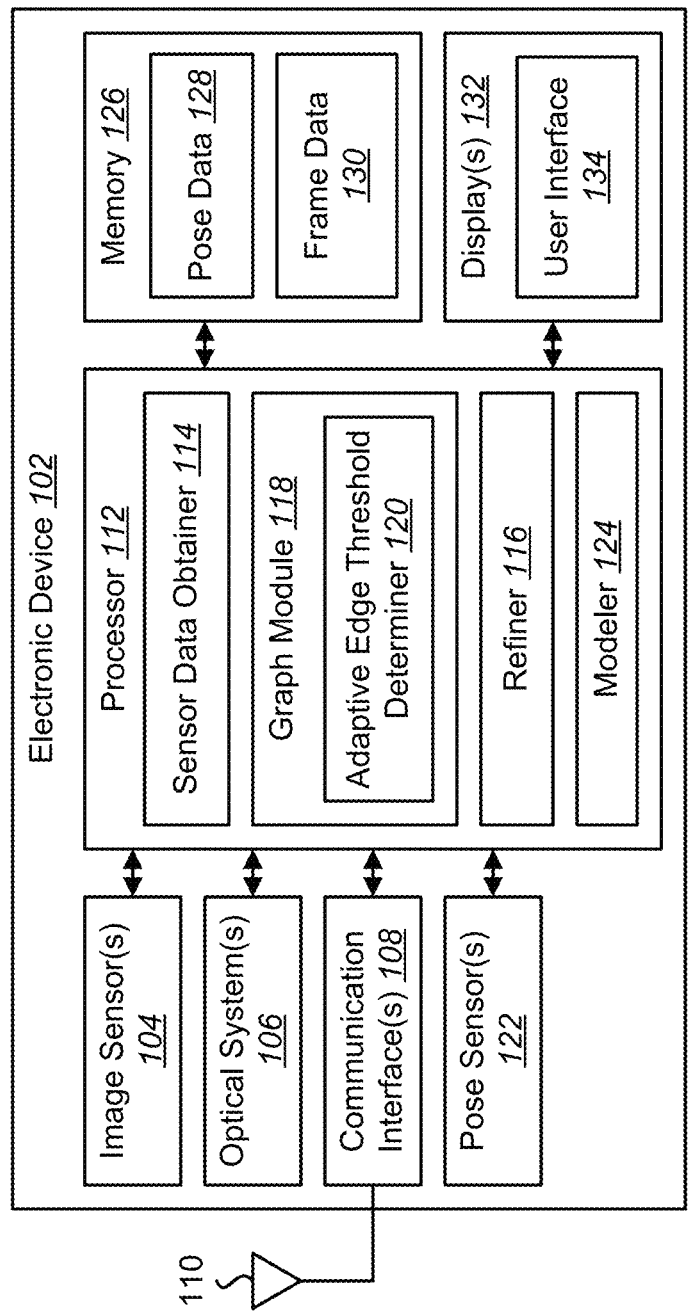
FIG. 1 is a block diagram illustrating one example of an electronic device in which systems and methods for outlier edge rejection may be implemented.

FIG. 1 is a block diagram illustrating one example of an electronic device 102 in which systems and methods for outlier edge rejection may be implemented. Examples of the electronic device 102 include vehicles (e.g., semi-autonomous vehicles, autonomous vehicles, etc.), automobiles, robots, aircraft, drones, unmanned aerial vehicles (UAVs), servers, computers (e.g., desktop computers, laptop computers, etc.), network devices, cameras, video camcorders, digital cameras, cellular phones, smart phones, tablet devices, personal cameras, wearable cameras, virtual reality devices (e.g., headsets), augmented reality devices (e.g., headsets), mixed reality devices (e.g., headsets), action cameras, surveillance cameras, mounted cameras, connected cameras, healthcare equipment, gaming consoles, appliances, etc. In some configurations, the electronic device 102 may be integrated into one or more devices (e.g., vehicles, drones, mobile devices, etc.). The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may include a processor 112, a memory 126, one or more displays 132, one or more image sensors 104, one or more optical systems 106, one or more communication interfaces 108, and/or one or more pose sensors 122. The processor 112 may be coupled to (e.g., in electronic communication with) the memory 126, display(s) 132, image sensor(s) 104, optical system(s) 106, communication interface(s) 108, and/or pose sensor(s) 122. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may perform one or more of the functions, procedures, methods, steps, etc., described in connection with one or more of FIGS. 1-11. Additionally or alternatively, the electronic device 102 may include one or more of the structures described in connection with one or more of FIGS. 1-11.

The memory 126 may store instructions and/or data. The processor 112 may access (e.g., read from and/or write to) the memory 126. Examples of instructions and/or data that may be stored by the memory 126 may include pose data 128 (e.g., position data and/or orientation data, etc.), frame data 130 (e.g., image data, depth image data, and/or thermal image data, etc.), sensor data obtainer 114 instructions, graph module 118 instructions, adaptive edge threshold determiner 120 instructions, refiner 116 instructions, modeler 124 instructions, and/or instructions for other elements, etc.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. For example, the communication interface 108 may enable one or more kinds of wireless (e.g., cellular, wireless local area network (WLAN), personal area network (PAN), etc.) communication. Additionally or alternatively, the communication interface 108 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface(s) 108 may send information (e.g., pose information, image information, location information, object detection information, map information, etc.) to and/or receive information from another electronic device (e.g., a vehicle, a smart phone, a camera, a display, a robot, a remote server, etc.).

In some configurations, the electronic device 102 (e.g., sensor data obtainer 114) may obtain (e.g., receive) one or more frames (e.g., image frames, video, depth image frames, thermal image frames, etc.). The one or more frames may indicate data captured from an environment (e.g., one or more objects and/or background).

In some configurations, the electronic device 102 may include one or more image sensors 104 and/or one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations. The one or more image sensor(s) 104 may be used in conjunction with the optical system(s) 106 or without the optical system(s) 106 depending on the implementation. In some implementations, the electronic device 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the electronic device 102 may include multiple optical system(s) 106 and/or multiple image sensors 104. For example, the electronic device 102 may include two or more lenses in some configurations. The lenses may have the same focal length or different focal lengths.

In some examples, the image sensor(s) 104 and/or the optical system(s) 106 may be mechanically coupled to the electronic device 102 or to a remote electronic device (e.g., may be attached to, mounted on, and/or integrated into the body of a vehicle, the hood of a car, a rear-view mirror mount, a side-view mirror, a bumper, etc., and/or may be integrated into a smart phone or another device, etc.). The image sensor(s) 104 and/or optical system(s) 106 may be linked to the electronic device 102 via a wired and/or wireless link.

Examples of image sensor(s) 104 may include visual image sensors, depth image sensors, thermal image sensors, etc. For example, the electronic device 102 may include one or more depth sensors (e.g., time-of-flight cameras, lidar sensors, etc.) and/or one or more thermal sensors (e.g., infrared thermal sensors). The image sensor(s) 104 may capture one or more image frames (e.g., visual image frames, depth image frames, thermal image frames, etc.). In some implementations, the electronic device 102 may include multiple optical system(s) 106 and/or multiple image sensors 104. Different lenses may each be paired with separate image sensors 104 in some configurations. Additionally or alternatively, two or more lenses may share the same image sensor 104. It should be noted that one or more other types of sensors may be included and/or utilized to produce frames in addition to or alternatively from the image sensor(s) 104 in some implementations.

In some configurations, a camera may include at least one sensor and at least one optical system. Accordingly, the electronic device 102 may be one or more cameras and/or may include one or more cameras in some implementations.

In some configurations, the electronic device 102 may request and/or receive the one or more frames from another device (e.g., one or more external sensors coupled to the electronic device 102). In some configurations, the electronic device 102 may request and/or receive the one or more frames via the communication interface 108. For example, the electronic device 102 may or may not include an image sensor 104 and may receive frames (e.g., visual image frames, depth image frames, and/or thermal image frames, etc.) from one or more remote devices.

The electronic device may include one or more displays 132. The display(s) 132 may present visual content (e.g., one or more image frames, video, still images, graphics, virtual environments, three-dimensional (3D) image content, 3D models, symbols, characters, etc.). The display(s) 132 may be implemented with one or more display technologies (e.g., liquid crystal display (LCD), organic light-emitting diode (OLED), plasma, cathode ray tube (CRT), etc.). The display(s) 132 may be integrated into the electronic device 102 or may be coupled to the electronic device 102. For example, the electronic device 102 may be a virtual reality headset with integrated displays 132. In another example, the electronic device 102 may be a computer that is coupled to a virtual reality headset with the displays 132. In some configurations, the content described herein (e.g., frames, 3D models, etc.) may be presented on the display(s) 132. For example, the display(s) 132 may present an image depicting a 3D model of an environment (e.g., one or more objects). In some configurations, all of portions of the frames that are being captured by the image sensor(s) 104 may be presented on the display 132. Additionally or alternatively, one or more representative images (e.g., icons, cursors, virtual reality images, augmented reality images, etc.) may be presented on the display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera and may detect user gestures (e.g., hand gestures, arm gestures, eye tracking, eyelid blink, etc.). In another example, the electronic device 102 may be linked to a mouse and may detect a mouse click. In yet another example, the electronic device 102 may be linked to one or more other controllers (e.g., game controllers, joy sticks, touch pads, motion sensors, etc.) and may detect input from the one or more controllers.

In some configurations, the electronic device 102 and/or one or more components or elements of the electronic device 102 may be implemented in a headset. For example, the electronic device 102 may be a smartphone mounted in a headset frame. In another example, the electronic device 102 may be a headset with integrated display(s) 132. In yet another example, the display(s) 132 may be mounted in a headset that is coupled to the electronic device 102.

In some configurations, the electronic device 102 may be linked to (e.g., communicate with) a remote headset. For example, the electronic device 102 may send information to and/or receive information from a remote headset. For instance, the electronic device 102 may send information (e.g., pose data, frame data, one or more images, video, one or more frames, graph data, 3D model data, etc.) to the headset and/or may receive information (e.g., captured frames) from the headset.

In some configurations, the electronic device 102 may include one or more pose sensors 122. Examples of pose sensor(s) 122 may include one or more accelerometers, tilt sensors, gyros, Global Positioning System (GPS) receivers, motion sensors, inertial measurement units (IMUs), image sensors, etc. The pose sensor(s) 122 may be utilized to detect one or more poses of the electronic device 102 and/or of the image sensor(s) 104. In some configurations, a pose may include position and/or orientation of the electronic device 102 and/or image sensor(s) 104 (e.g., rotations in one or more dimensions and/or translations in one or more dimensions). In some implementations, one or more image sensor(s) 104 may be utilized as pose sensor(s) 122 and/or an image-based (e.g., red-green-blue (RGB)-based, red-green-blue-depth (RGBD)-based, etc.) algorithm may be utilized to estimate pose. Additionally or alternatively, the image sensor(s) 104 and pose sensor(s) 122 may be mounted on the same rigid frame (e.g., rigid mounting frame, rigid vehicle frame, etc.).

In some configurations, the pose sensor(s) 122 may include one or more accelerometers and/or one or more gyroscopes for detecting pose. The accelerometer(s) may detect acceleration in one or more directions (e.g., along one or more axes), which may be utilized to determine translation in one or more dimensions. The gyroscope(s) may detect orientation. For example, the gyroscope(s) may determine roll, pitch, and/or yaw values. In some implementations, the pose sensor(s) 122 may provide three-dimensional (3D) accelerometer information and 3D gyroscope information that indicate pose.

The pose(s) may be relative to a coordinate system. For example, the pose(s) may be expressed as translational values in three dimensions (e.g., x, y, and z) and rotational values in three dimensions (e.g., yaw, pitch, and roll). In some configurations, the coordinate system may correspond to the Earth (e.g., in Earth coordinates, World Geodetic System 1984 (WGS84) coordinates, Earth-centered Earth-fixed (ECEF) coordinates, east north up (ENU) coordinates, etc.). In some configurations, the coordinate system may be arbitrary (e.g., correspond to an initial pose, correspond to a predetermined location and/or orientation, etc.). In some configurations, the coordinate system may partially correspond to the Earth (e.g., a vertical axis may correspond to a gravity vector and horizontal axes may correspond to an initial pose, etc.).

The processor 112 may include and/or implement a sensor data obtainer 114, a graph module 118, a refiner 116, and/or a modeler 124. In some configurations, the graph module 118 may include an adaptive edge threshold determiner 120. It should be noted that one or more of the elements illustrated in the electronic device 102 and/or processor 112 may be optional. For example, the processor 112 may not include and/or implement the modeler 124 in some configurations.

Additionally or alternatively, one or more of the elements illustrated in the processor 112 may be implemented separately from the processor 112 (e.g., in other circuitry, on another processor, on a separate electronic device, etc.).

The processor 112 may include and/or implement a sensor data obtainer 114. The sensor data obtainer 114 may obtain sensor data from one or more sensors. For example, the sensor data obtainer 114 may obtain (e.g., receive) one or more frames (e.g., image frames, depth image frames, and/or thermal image frames, etc.) and/or one or more poses. For instance, the sensor data obtainer 114 may receive image data from one or more image sensors 104 included in the electronic device 102 and/or from one or more remote image sensors. Additionally or alternatively, the sensor data obtainer 114 may receive pose data from one or more pose sensors 122 included in the electronic device 102 and/or from one or more remote pose sensors. For example, the sensor data obtainer 114 may obtain one or more frames and/or one or more poses from one or more remote devices via the communication interface(s) 108.

It should be noted that some frames and/or poses may differ. For example, the image sensor(s) 104 and/or the pose sensor(s) 122 may move between some frames. In some approaches, the image sensor(s) 104 and/or pose sensor(s) 122 may move due to motion of the electronic device 102 (e.g., smart phone, camera, vehicle, robot, etc.).

In some configurations, the sensor data obtainer 114 may determine one or more key frames from the obtained frames. One or more frame criteria may be utilized to determine the key frame(s). For example, the sensor data obtainer 114 may determine the key frame(s) based on one or more frame spatial criteria, frame time criteria, and/or frame comparison criteria. In some approaches, a frame spatial criterion may indicate a threshold distance between poses for key frames. For example, two frames may be determined as key frames if there is at least a threshold distance between the poses corresponding to the frames. In some approaches, a frame time criterion may indicate a threshold time between key frames. For example, two frames may be determined as key frames if there is at least a threshold time between the capture times of the frames. In some approaches, a frame comparison criterion may indicate a threshold content difference between key frames. For example, two frames may be determined as key frames if there is at least a threshold difference in content (e.g., color, intensity, and/or features, etc.) between the frames. In some configurations, a combination of criteria may be utilized. For example, frames may be determined as key frames if there is a threshold distance or a threshold time between the frames. In another example, frames may be determined as key frames if there is both a threshold distance and a threshold time between the frames.

The processor 112 may include and/or implement a graph module 118. The graph module 118 may produce a graph. For example, the sensor data obtainer 114 may provide one or more frames, one or more poses, and/or one or more key frames to the graph module 118. The graph module 118 may produce the graph based on the frame(s), pose(s), and/or key frame(s). For example, the graph module 118 may generate one or more nodes corresponding to one or more frames (e.g., key frames) with one or more poses.

In some configurations, the graph module 118 may produce the graph incrementally. For example, the graph module 118 may produce the graph as frames and/or poses are being captured and/or received. The graph module 118 may not require an entire data set (e.g., all frames and/or all poses) to produce the graph. Additionally or alternatively, the graph module 118 may produce the graph with an open data set, where one or more additional frames and/or poses may be added.

The graph module 118 may incrementally add nodes to the graph. For example, the graph module 118 may generate a node to represent a new frame with a pose. The node may be added to the graph. Each time another frame with a pose is received, the graph module 118 may generate a new node and add the node to the graph. As used herein, the term "current node" may mean a most recent node (e.g., a node under current operation, a node most recently added to the graph, etc.).

In some configurations, the graph module 118 may determine one or more candidate neighbor nodes relative to a current node. For example, the graph module 118 may determine one or more nodes of the graph as one or more candidate neighbor nodes in the graph. A candidate neighbor node is a node that satisfies one or more node criteria relative to the current node. In particular, the graph module 118 may utilize one or more node criteria to determine the candidate neighbor node(s). For example, the graph module 118 may determine the candidate neighbor node(s) based on one or more node spatial criteria, node time criteria, and/or node comparison criteria.

In some approaches, a node spatial criterion may indicate a threshold distance between poses for candidate neighbor nodes. For example, a node may be determined as a candidate neighbor node if the pose of the node is within a threshold distance from the pose of the current node. In some approaches, a node time criterion may indicate a threshold time between nodes. For example, a node may be determined as a candidate neighbor node if the capture time of the frame of the node is within a threshold time from the capture time of the frame of the current node. In some approaches, a node comparison criterion may indicate a threshold content difference between nodes. For example, a node may be determined as a candidate neighbor node if the frame (e.g., image data) of the node is within a threshold content difference (e.g., color, intensity, and/or features, etc.) from the frame (e.g., image data) of the current node. In some configurations, a combination of criteria may be utilized. For example, one or more nodes may be determined as candidate neighbor nodes if the node(s) are within a threshold distance or a threshold time between from the current node. In another example, one or more nodes may be determined as candidate neighbor nodes if the node(s) are within a threshold distance and a threshold time between the nodes.

The graph may include one or more candidate edges. A candidate edge may be a potential edge (e.g., connection) between nodes. In some approaches, a candidate edge may exist between the current node and each candidate neighbor node. For example, the graph module 118 may determine the candidate edges by determining one or more candidate neighbor nodes of a current node, where a candidate edge exists between the current node and each candidate neighbor node.

The graph module 118 may include an adaptive edge threshold determiner 120. The adaptive edge threshold determiner 120 may determine an adaptive edge threshold for each candidate edge. For example, the adaptive edge threshold determiner 120 may incrementally determine an adaptive edge threshold for each candidate edge between the current node and each candidate neighbor node. The adaptive edge threshold may be a threshold for determining whether to accept or reject each candidate edge. Accepting a candidate edge may include establishing an edge (e.g., connection) between two nodes of the graph. Rejecting a candidate edge may include discarding the candidate edge (e.g., not using the candidate edge to connect the current node with the corresponding candidate neighbor node).

In some configurations, determining whether to accept or reject a candidate edge may be based on a similarity measure between nodes corresponding to the candidate edge. The adaptive edge threshold determiner 120 may determine a similarity measure for each candidate edge. For example, the adaptive edge threshold determiner 120 may determine a similarity measure between the current node and each corresponding candidate neighbor node. The similarity measure may be determined and/or expressed in terms of similarity or dissimilarity. For example, the similarity measure may be based on the similarity between poses of nodes (e.g., similarity in position and/or orientation), similarity between features of nodes (e.g., amount of overlap or intersection between features of corresponding key frames), and/or reprojection error between nodes (e.g., normalized reprojection error). Reprojection error may be a measure of dissimilarity. In some configurations, the reprojection error may be determined between key frames (e.g., nodes). For example, the electronic device 102 may project one key frame into 3D space, perform a transformation (based on a difference in poses between the key frames), and re-project to the other key frame. Then, some approach to similarity may be utilized to determine the reprojection error, such as pixel intensity. It should be noted that the similarity measure may be expressed and/or determined in terms of other similarities and/or dissimilarities. One example of similarity may be measured by a transformation or deformation between frames, while other examples may be measured differently (e.g., is not limited to transformation or deformation).

The adaptive edge threshold determiner 120 may determine each adaptive edge threshold based on the similarity measure. In some configurations, each adaptive edge threshold may be determined incrementally. For example, each adaptive edge threshold may be determined for each candidate edge.

In some approaches, each adaptive edge threshold may be determined based on a cumulative similarity measure. The cumulative similarity measure may be an accumulation of one or more similarity measures. In some approaches, the cumulative similarity measure may be denoted $\Sigma r_n$, where $r_n$ is an n-th similarity measure corresponding to an n-th candidate edge. The cumulative similarity measure may be utilized to determine an incremental mean $\mu_n$ in accordance with Equation (1).

$$\mu_n = \frac{\sum r_n}{n} \tag{1}$$

In Equation (1), n is a number of visited edges (e.g., a number of candidate edges incrementally traversed), $r_n$ is the similarity measure, and $\mu_n$ is the incremental mean. For example, the adaptive edge threshold determiner 120 may determine (e.g., calculate) the incremental mean of the visited edges' similarity measures.

In some configurations, the adaptive edge threshold determiner 120 may determine (e.g., calculate) the adaptive edge threshold. Listing (1) illustrates an approach to determine an adaptive edge threshold (e.g., data adaptive threshold).

Listing (1)

```
if 2μ_n − r_n > 1 then
    s_n = 0.5s_{n−1};
else
    s_n = s_{n−1};
end
```

$$th_n = \mu_n - s_n \frac{2(1-\mu_n)}{3}$$

In Listing (1), $s_n$ is an annealing term and $th_n$ is the adaptive edge threshold for edge candidate n. The adaptive edge threshold may be determined based on the incremental mean and the annealing term. In general, an annealing term may be a term used to control approximate optimization of a given function. In Listing (1), the annealing term may control the convergence speed of the adaptive edge threshold. For example, the annealing term may be initialized to a value (e.g., 1). As illustrated in Listing (1), if $2\mu_n - r_n > 1$, the annealing term may be reduced (e.g., divided by a factor, multiplied by 0.5, etc.). Otherwise, the annealing term may be maintained. It should be noted that the term $$\frac{2(1-\mu_n)}{3}$$

may be a substitution (e.g., approximation) for $2\sigma_n$, where $\sigma_n$ is the standard deviation of the similarity measures. This substitution may be beneficially utilized in some configurations, since the mean $\mu_n$ may converge more quickly than the standard deviation.

In some configurations, the graph module 118 may determine whether to accept or reject a candidate edge based on the adaptive edge threshold. Listing (2) provides an example of an approach for determining whether to accept or reject an edge in accordance with some configurations of the systems and methods disclosed herein.

```
if r_n < th_n then
    current candidate edge is rejected;
else
    current candidate edge is accepted;
end
        Listing (2)
```

An accepted candidate edge may become an edge in the graph, thereby indicating that the two connected nodes are related with a degree of similarity. A rejected candidate edge may be considered to be an outlier edge.

Determining the adaptive edge threshold may improve graph accuracy. For example, the distribution of similarity among data (e.g., image data, pose data, etc.) is data-dependent. Accordingly, accurate determination of an outlier may also depend on data distribution. Because the distribution of the data (e.g., image data, pose data, etc.) depends on the data itself and because outliers are determined based on the distribution, accurate estimation of the distribution may lead to a more accurate estimation of an outlier threshold (e.g., the adaptive edge threshold). Because data (e.g., image data, pose data, etc.) may vary, the outlier threshold may be adapted to the data to produce a more accurate graph (e.g., a more accurate representation of the relationships between nodes in the graph). For example, the adaptive edge threshold may be deduced from an incremental fitted Gaussian model. This may be a superior approach compared with an approach that utilizes a pre-defined or fixed threshold (with a pre-defined and/or assumed Gaussian distribution), since the distribution and/or threshold may not accurately correspond to the actual data distribution.

The processor 112 may include and/or implement a refiner 116. The refiner 116 may perform refining (e.g., bundle adjustment) based on the graph to produce refined data (e.g., bundle-adjusted data). For example, the refiner 116 may adjust one or more of the poses associated with the nodes to reduce (e.g., minimize) reprojection error. In some approaches, refining may be performed incrementally. For example, refining may be performed each time a node is added to the graph and/or each time a candidate edge is accepted. Additionally or alternatively, refining may be performed after all of the data (e.g., frames, key frames, and/or poses) are collected. Performing refining may produce refined data. For example, performing refining may produce one or more adjusted (e.g., refined) poses. Some configurations of the systems and methods disclosed herein may benefit refining (e.g., bundle adjustment). For example, the adaptive edge threshold may result from an incrementally fitted Gaussian model. Accordingly, the outlier edges that are automatically detected by the adaptive threshold may be more data-fitted and accurate. Thus, refining may be performed based on more accurate data. It should also be noted that in some configurations, outlier nodes may be detected instead of or in addition to outlier edges. Bundle adjustment may be one example of refining. For instance, bundle adjustment may provide an approach for optimization and/or minimization.

The processor 112 may include and/or implement a modeler 124. The modeler 124 may produce a three-dimensional (3D) model based on the refined data (e.g., bundle-adjusted data). For example, the modeler 124 may produce a mesh model of one or more objects (e.g., environment, people, and/or items, etc.). In some approaches, the modeler 124 may utilize multiple image frames (e.g., partial 3D models) to produce a mesh model based on the refined data.

The 3D model may be utilized in a variety of ways. For example, the 3D model may be utilized for presentation on a display, for route planning, for measurement, and/or for other analysis. In some configurations, the 3D model may be presented on one or more displays. For example, a camera may capture multiple images of an object from different poses, which may be utilized to produce a 3D model that may be presented on a virtual reality headset. In some configurations, the electronic device 102 may be an autonomous vehicle, semi-autonomous vehicle, drone, aircraft, and/or robot, etc., that utilizes one or more 3D models (e.g., map) to navigate through an environment. In other configurations, the 3D model may be utilized to segment an environment. For example, the electronic device 102 may be a mobile device (e.g., smartphone, tablet, etc.) that uses the 3D model to segment one or more objects from a map. For instance, the mobile device may capture images of a room, build a 3D model of the room, segment out one or more pieces of furniture, and/or insert a hypothetical 3D furniture model into the room. In other configurations, the 3D model may be utilized to print a 3D object. For example, the 3D model may be provided to a 3D printer to print an item in the shape of the 3D model.

In some configurations, the user interface 134 may provide one or more controls relative to the 3D model. For example, the user interface 134 may receive one or more commands for starting navigation (e.g., route planning and/or movement control, etc.) based on the 3D model. In another example, the user interface 134 may receive an input indicating an object to segment from the 3D model.

It should be noted that the data adaptive outlier rejection techniques described herein may be implemented for refining (e.g., online and/or offline bundle adjustment) in some simultaneous localization and mapping (SLAM) systems. For example, the techniques described herein may be implemented with red-green-blue-depth (RGB-D) images (e.g., RGB-D cameras), RGB only images (e.g., RGB cameras), and/or depth only images (e.g., depth cameras). Additionally or alternatively, the data adaptive outlier rejection techniques may be implemented by replacing RGB or depth images (e.g., RGB or depth cameras) with any other modality (e.g., histogram of gradients (HoG) features, scale invariant feature transform (SIFT) features, etc.) instead of RGB images. Additionally or alternatively, the techniques disclosed herein may be implemented for a wide variety of similarity-based and/or dissimilarity-based graph construction and/or optimization (e.g., online and/or offline graph construction and/or optimization).

In some configurations, the electronic device 102 (e.g., processor 112) may optionally be coupled to, be part of (e.g., be integrated into), include, and/or implement one or more kinds of devices. For example, the electronic device 102 may be implemented in a vehicle equipped with one or more cameras. In another example, the electronic device 102 may be implemented in a drone equipped with one or more cameras. In other examples, the electronic device 102 (e.g., processor 112) may be implemented in a server or a smart phone.

In some configurations, the electronic device 102 may be a network device (e.g., server, cloud device, etc.) that communicates with one or more other devices. For example, the electronic device 102 may communicate with one or more autonomous vehicles, self-driving vehicles, semi-autonomous vehicles, computers, smartphones, and/or tablet devices, etc. For instance, the electronic device 102 may receive data (e.g., frame data and/or pose data, etc.) from one or more remote devices. The electronic device 102 may perform one or more of the techniques described herein (e.g., add node(s), determine edge threshold(s), accept or reject edge(s), perform refining, and/or produce a 3D model, etc.) and may provide one or more outputs (e.g., the graph, the adaptive edge threshold(s), refined data, 3D model, etc.) to the one or more remote devices.

Figure 2:
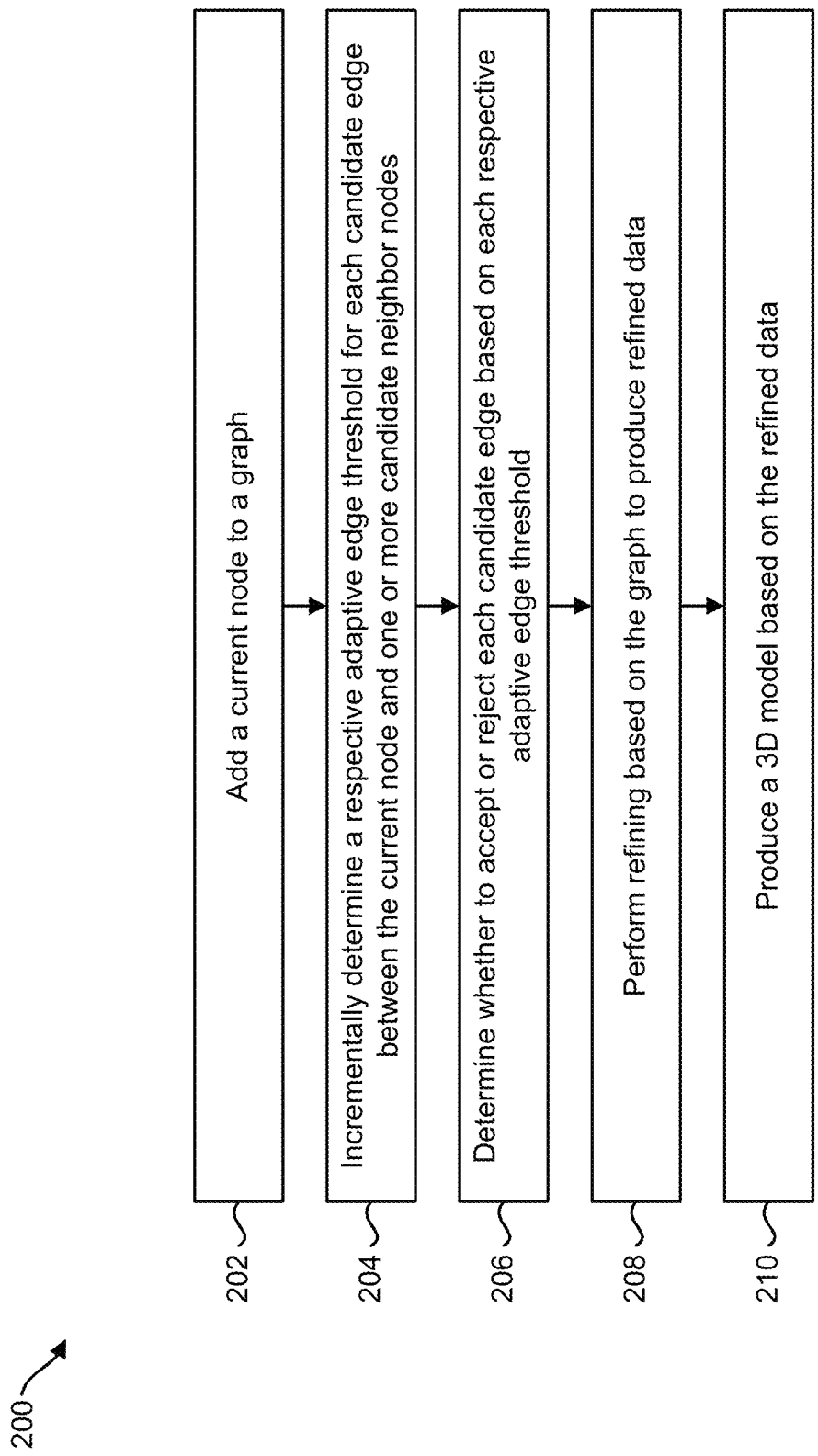
FIG. 2 is a flow diagram illustrating one configuration of a method for outlier edge rejection.

FIG. 2 is a flow diagram illustrating one configuration of a method 200 for outlier edge rejection. The method 200 may be performed by the electronic device 102 described in connection with FIG. 1. The electronic device 102 may add 202 a current node to a graph. This may be accomplished as described in connection with FIG. 1. For example, the electronic device 102 may obtain a pose based on sensor data and may generate a node for the pose. In some configurations, the electronic device 102 may allocate memory to represent the node and/or may store the pose data 128 corresponding to the node. In some approaches, adding 202 the current node to the graph may be performed incrementally. For example, a new node may be created and/or added each time a pose is obtained (e.g., each time a pose corresponding to a key frame is obtained).

The electronic device 102 may incrementally determine 204 (e.g., calculate) a respective adaptive edge threshold for each candidate edge between the current node and one or more candidate neighbor nodes. This may be accomplished as described in connection with FIG. 1. For example, the electronic device 102 may determine a cumulative similarity measure for each candidate edge. The cumulative similarity measure may be accumulated for each candidate edge. The electronic device 102 may utilize each cumulative similarity measure to determine a respective incremental mean for each candidate edge. The electronic device 102 may determine each adaptive edge threshold based on each respective incremental mean. For example, the electronic device 102 may determine an annealing term based on the incremental mean and the similarity measure. The incremental mean and the anneal term may be utilized to determine the adaptive edge threshold. In some configurations, determining the adaptive edge threshold may be accomplished in accordance with Listing (1). Additionally or alternatively, the electronic device 102 may determine an incremental standard deviation, which may be utilized to determine the annealing term and/or the adaptive edge threshold. In some configurations, determining the adaptive edge threshold may be accomplished in accordance with Listing (3) (discussed below). It should be noted that incrementally calculating the incremental mean and/or the incremental standard deviation may be based on an adaptive Gaussian distribution model.

The electronic device 102 may determine 206 whether to accept or reject each candidate edge based on each respective adaptive edge threshold. This may be accomplished as described in connection with FIG. 1. For example, the electronic device 102 may compare each similarity measure with each respective adaptive edge threshold for each candidate edge. If a criterion based on the adaptive edge threshold is met (e.g., if the similarity measure is greater than or equal to the adaptive edge threshold), the corresponding edge may be accepted. If the criterion is not met (e.g., if the similarity measure is less than the adaptive edge threshold), the corresponding edge may be rejected.

The electronic device 102 may perform 208 refining based on the graph to produce refined data (e.g., bundle-adjusted data). This may be accomplished as described in connection with FIG. 1. In some examples, the electronic device 102 may perform 208 refining by performing bundle adjustment. In some kinds of bundle adjustment, for instance, a distance measurement may be evaluated between the connected nodes (via an edge in a graph) with respect to a variable (e.g., pose). The sum of all distance measures over the graph may be minimized with respect to the variables. An example of bundle adjustment can be illustrated by the following minimization problem with the formula arg min $\rho \Sigma_i \Sigma_{j \in N(i)} \text{dist}(f(x_i, \rho_{ij}), x_j)$, where i and j are indexes of a key frame. In this example, $N(i)$ may denote a set of neighboring keyframes and $f(x, \rho)$ is a mapping between two keyframes, where $\rho$ denotes associated variables. For instance, the variables may be pose data (e.g., refined pose data, optimal pose data, etc.).

The electronic device 102 may produce 210 a 3D model based on the refined data (e.g., bundle-adjusted data). This may be accomplished as described in connection with FIG. 1. For example, with refined pose data obtained from refining (e.g., bundle-adjustment optimization), a partial 3D model associated with each node (e.g., keyframe) may be aligned to the same coordinates and/or fused to obtain a complete 3D model. For instance, image data (e.g., partial 3D models, point cloud(s), etc.) corresponding to multiple frames may be aligned to the same coordinates by performing refining. The aligned image data (e.g., partial 3D models, point cloud(s), etc.) may be fused (e.g., combined) to form the 3D model (e.g., mesh).

In some configurations, the electronic device 102 may perform one or more operations with the 3D model. For example, the 3D model (and/or refined data) may be transmitted to a remote device (e.g., cloud device, remote server, and/or one or more vehicles). The electronic device 102 and/or a remote device may utilize the 3D model (and/or refined data) in generating and/or updating (e.g., refining) a map in some approaches. In another example, the electronic device 102 may perform one or more navigation operations (e.g., route planning and/or movement control, etc.) based on the 3D data. For instance, the electronic device 102 may plan a route and/or control movement to avoid colliding with one or more objects indicated by the 3D model. In yet another example, the electronic device 102 may segment one or more objects from a scene based on the 3D model. In yet another example, the electronic device 102 may present the 3D model for viewing and/or manipulation. In yet another example, the electronic device 102 may produce a 3D virtual environment based on the 3D model. In yet another example, the electronic device 102 may generate augmented reality content based on the 3D model. For instance, the electronic device 102 may insert one or more virtual objects (e.g., people, structures, virtual furniture, and/or environmental effects, etc.) into the 3D model.

Figure 3:
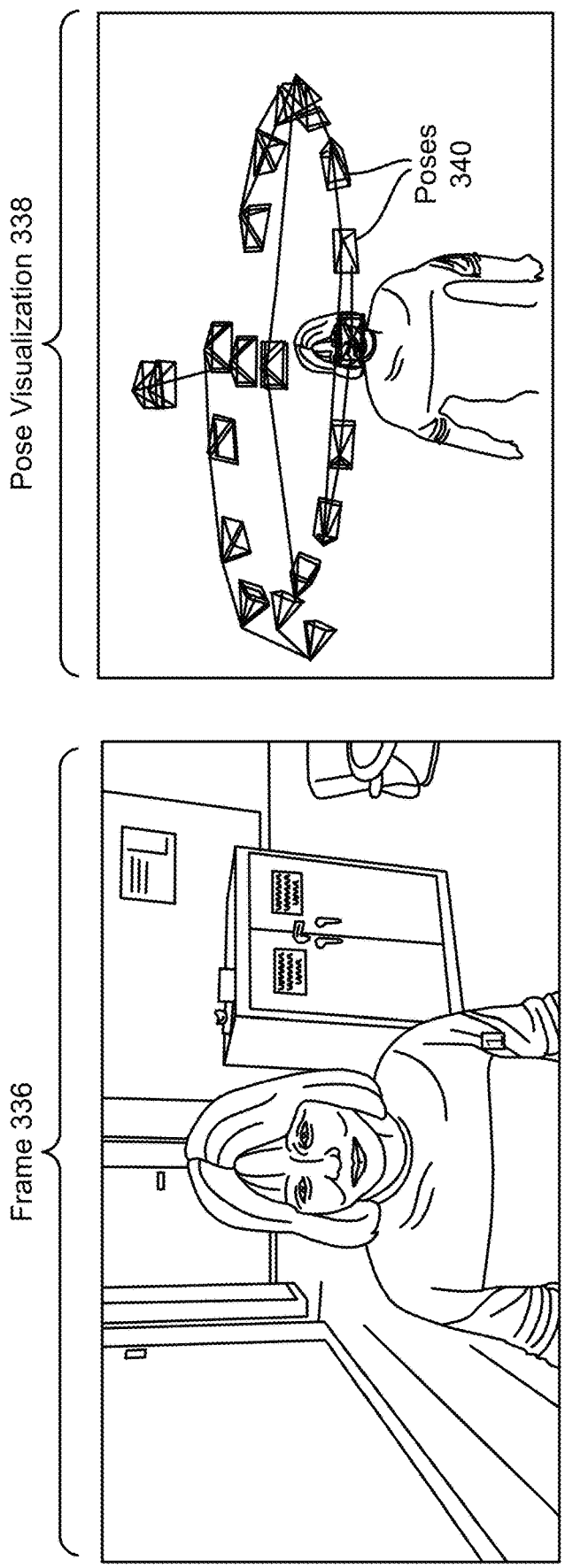
FIG. 3 is a diagram illustrating an example of a frame and a pose visualization.

FIG. 3 is a diagram illustrating an example of a frame 336 and a pose visualization 338. In this example, the frame 336 is an image frame depicting a person. In some configurations, for instance, a frame of input red green blue (RBG) video may be obtained. In order to create a 3D model of the person, several frames may be captured from different poses 340. As illustrated in the pose visualization 338 (e.g., a tracking view), several frames (e.g., key frames) may be obtained with corresponding poses 340. In particular, the pose visualization 338 illustrates several poses of frame capture around the person depicted in the frame 336.

Figure 4:
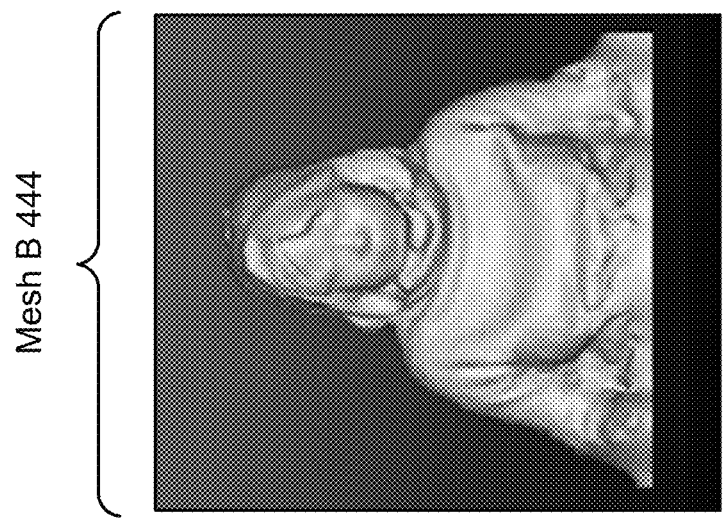
FIG. 4 is a diagram illustrating mesh A and mesh B.
Figure 4:
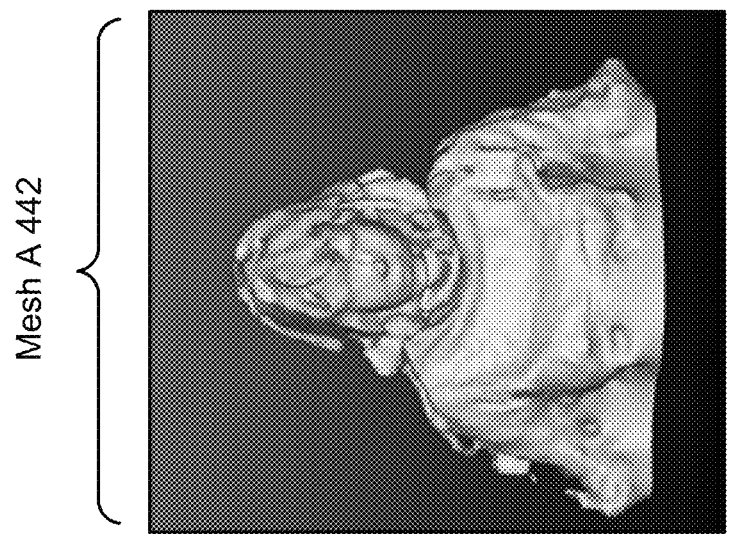

FIG. 4 is a diagram illustrating mesh A 442 and mesh B 444. Mesh A 442 is a visualization of a 3D model of the person depicted in FIG. 3. In particular, mesh A 442 illustrates a resulting 3D model (e.g., reconstructed mesh) due to false links. For example, mesh A 442 may result without performing adaptive outlier edge rejection as described herein. Specifically, frames with corresponding poses may be obtained as described in connection with FIG. 3. The frames and poses may be represented in a graph structure in some approaches.

Refining may be performed on the data represented by the graph structure to reduce error. In some approaches, refining (e.g., bundle adjustment) may include minimizing overall or incremental reprojection error for the graph. For example, reprojection error may be minimized as a graph problem, where each node represents a key frame and key frames with similar pose are linked via edges. A similarity measure may be used to decide if an edge is accepted. A less reliable edge (e.g., outlier edge) may degrade the accuracy of the pose estimation dramatically as shown by mesh A 442. For example, if less reliable edges are included in the graph structure, pose estimation accuracy may be degraded, which may result in less accurate 3D models. As illustrated by this discussion, accepting or rejecting edges in the graph structure impacts 3D model quality (e.g., reconstructed mesh quality). The selection of a threshold for outlier rejection is non-trivial because the distribution of the similarity measures is data-dependent. This problem may be encountered in 3D tracking systems and/or any monocular simultaneous localization and mapping (SLAM)-based tracking.

Some configurations of the systems and methods disclosed herein may address the aforementioned problem. For example, incremental data-adaptive outlier edge rejection may improve outlier rejection. In particular, some implementations may utilize an incremental and data-adaptive outlier edge rejection algorithm to solve the aforementioned problem. In some approaches, the algorithm may be used to perform online refining when not all edges are available.

In FIG. 4, mesh B 444 is a visualization of a 3D model (e.g., a reconstructed mesh view) of the person depicted in FIG. 3. Mesh B 444 illustrates a visualization based on some configurations of the systems and methods disclosed herein. In particular, mesh B 444 was generated in accordance with some configurations of the systems and methods disclosed herein (e.g., using an adaptive edge threshold algorithm). Marked improvement can be observed when comparing mesh A 442 to mesh B 444.

Figure 5:
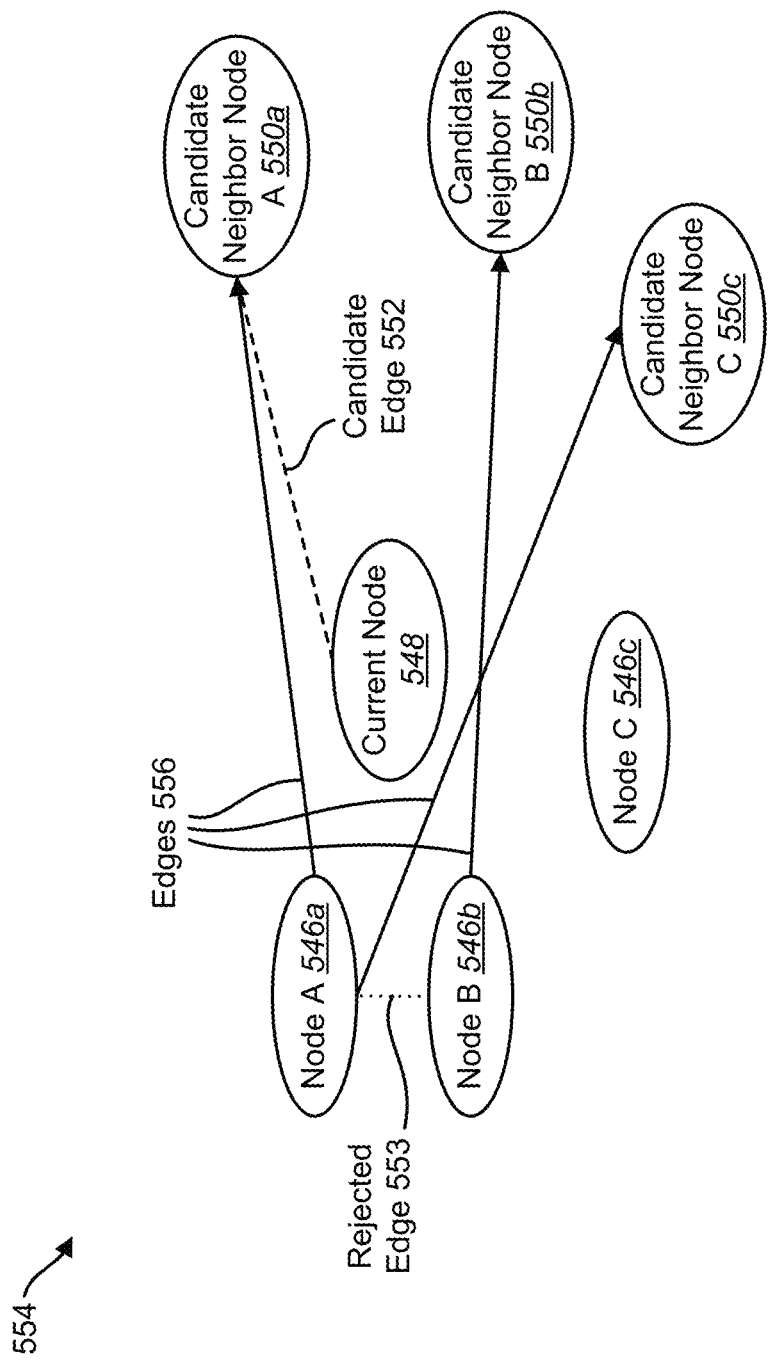
FIG. 5 provides an example of outlier edge rejection that may be performed in accordance with some configurations of the systems and methods disclosed herein.

FIG. 5 provides an example of outlier edge rejection that may be performed in accordance with some configurations of the systems and methods disclosed herein. In particular, FIG. 5 illustrates nodes A-C 546a-c, a current node 548, and candidate neighbor nodes A-C 550a-c in a graph 554. The graph 554 also includes some edges 556 (e.g., accepted visited edges). For example, the edges 556 between node A 546a and candidate neighbor node A 550a, between node A 546a and candidate neighbor node C 550c, and between node B 546b and candidate neighbor node B 550b, may have previously been evaluated and/or accepted. A rejected edge 553 (e.g., rejected visited edge, a previously visited candidate edge that was rejected, etc.) and a candidate edge 552 are also illustrated.

The current node 548 may represent a frame (e.g., key frame) with a pose. As illustrated in FIG. 5, a candidate edge 552 may exist between the current node 548 and candidate neighbor node A 550a. For example, when the current node 548 is added, candidate neighbor nodes A-C 550a-c may be determined, where respective candidate edges exist between the current node 548 and each candidate neighbor node A-C 550a-c.

The electronic device 102 may determine a similarity measure (e.g., $r_n$) between the current node 548 and candidate neighbor node A 550a for the candidate edge 552. The electronic device 102 may then determine an incremental mean (e.g., $\mu_n$) based on the similarity measure. In some approaches, the incremental mean may be determined in accordance with Equation (1) based on the similarity measures (e.g., a cumulative similarity measure) of the edges 556 (e.g., accepted visited edges), the rejected edge 553 (e.g., rejected visited edge), and/or the candidate edge 552. An adaptive edge threshold (e.g., $th_n$) may then be determined (in accordance with Listing (1), for example). The electronic device 102 may determine whether to accept or reject the candidate edge 552 by comparing the similarity measure to the adaptive edge threshold.

More generally, when new data (e.g., a new key frame with a pose) is obtained, the adaptive edge threshold (e.g., condition) may be incrementally updated to determine edge acceptance. Accordingly, a "poor" edge may be rejected or a "good" edge may be accepted. In some approaches, the threshold may be automatically generated via an incremental fitted Gaussian model. When the data is not good, the condition becomes stricter. When the data is good enough, the condition converges to a value (e.g., an "ideal" case).

Figure 6:
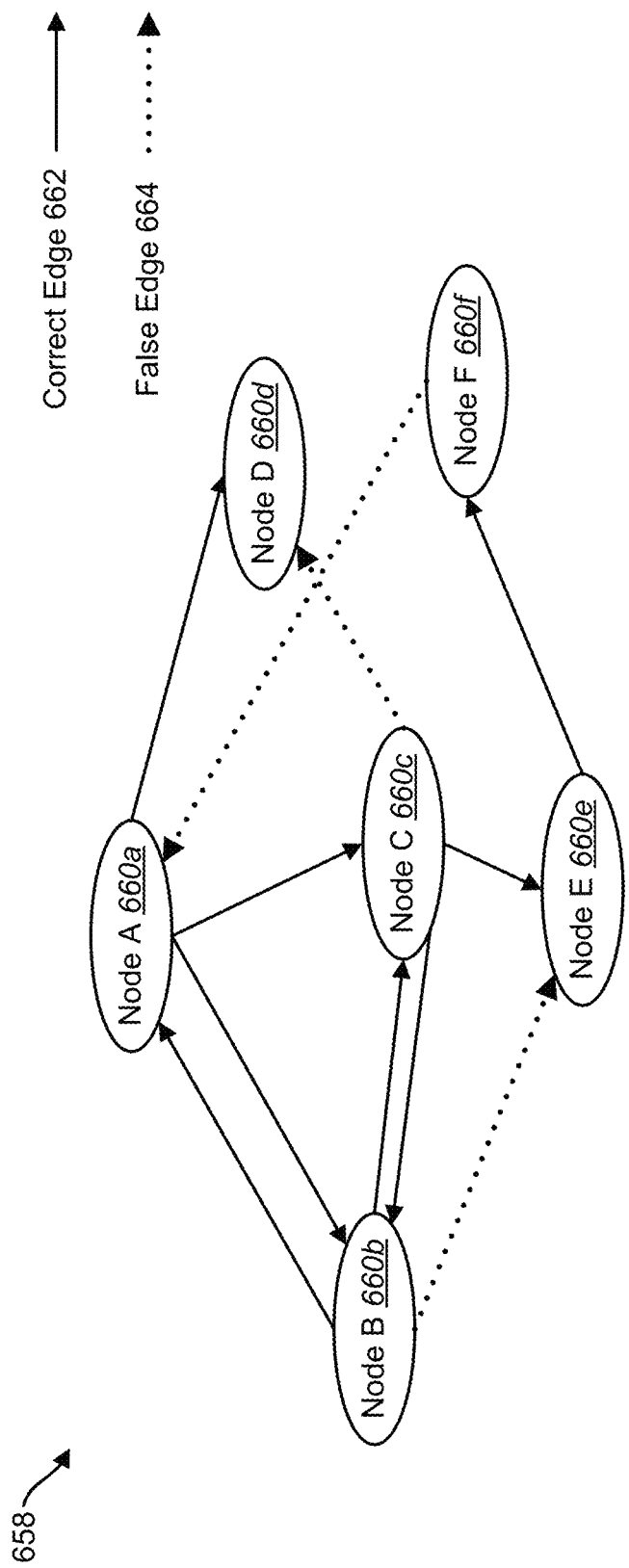
FIG. 6 is a diagram illustrating one example of a pose graph for bundle adjustment.

FIG. 6 is a diagram illustrating one example of a pose graph 658 for bundle adjustment. In particular, disadvantages of some approaches for bundle adjustment are discussed in connection with FIG. 6. As illustrated in FIG. 6, a pose graph 658 may include several nodes 660a-f. Some of the nodes 660a-f may be connected with correct edges 662 and/or false edges 664. For example, dissimilar nodes may be incorrectly connected with false edges 664. When false edges connect dissimilar nodes, 3D models such as mesh A 442 in FIG. 4 may result.

In one approach, it may be assumed that all nodes are connected with each other and a functional weight variable (e.g., $\Psi(.)$, where "." generally denotes an input) may be introduced for each edge in the graph. Then, the weighted pose graph may be refined. For example, a global bundle adjustment may be performed to minimize overall reprojection error in accordance with the equation arg min $\Psi, f \Sigma_i \Sigma_j \|\Psi_{ij}(f(x_i))-x_j\|^2$. This approach requires all poses to be available. Specifically, all poses must be obtained (e.g., no poses may be dynamically added) before refinement. This approach is an offline process and requires a high memory cost and time cost. In this approach, the functional weight variable $\Psi(.)$ is selected based on prior knowledge and/or a guess.

Figure 7:
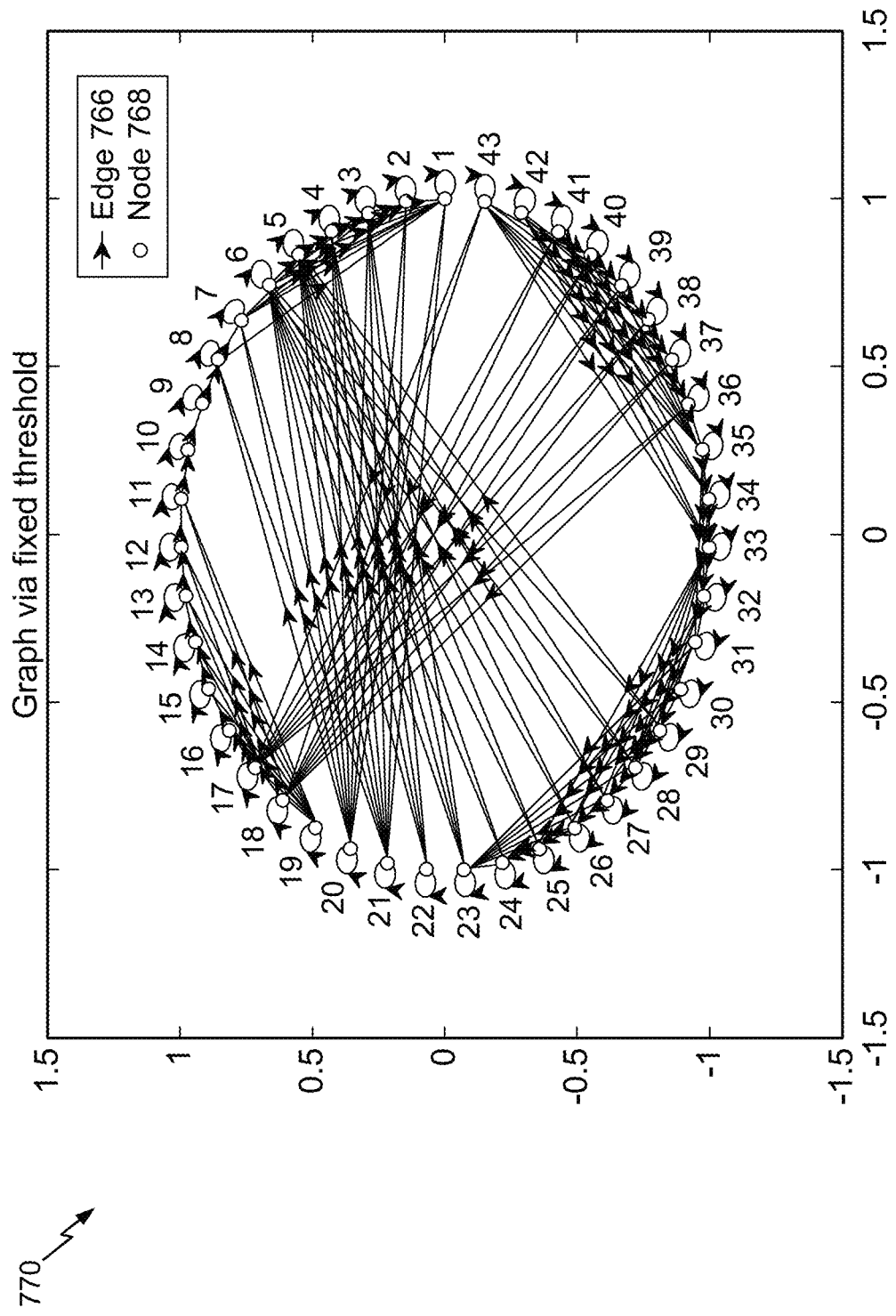
FIG. 7 is a plot of a graph with edges determined with a fixed threshold.

FIG. 7 is a plot 770 of a graph with edges 766 determined with a fixed threshold. Specifically, FIG. 7 illustrates an example of another approach where an adaptive edge threshold is not used. In this approach, a fixed (e.g., predetermined) threshold is utilized to accept or reject edges 766 between nodes 768. For example, an outlier threshold may be decided by an expert in some approaches. One disadvantage of this approach is that the fixed threshold may not perform well for all data sets, since similarity between nodes is data-dependent and may vary. For ease of illustration, the plot 770 illustrates the nodes 768 in a circle varying from −1 to 1 on both horizontal and vertical axes. In some approaches, an outlier edge rejection method based on an edge consistency metric defined via the graph cycle may be used. In yet other approaches, the contribution of the outlier edge may be disabled via a switchable loop closure constraint in the graph optimization. Some configurations may provide one or more advantages and/or benefits in view of these approaches as described in greater detail herein.

Figure 8:
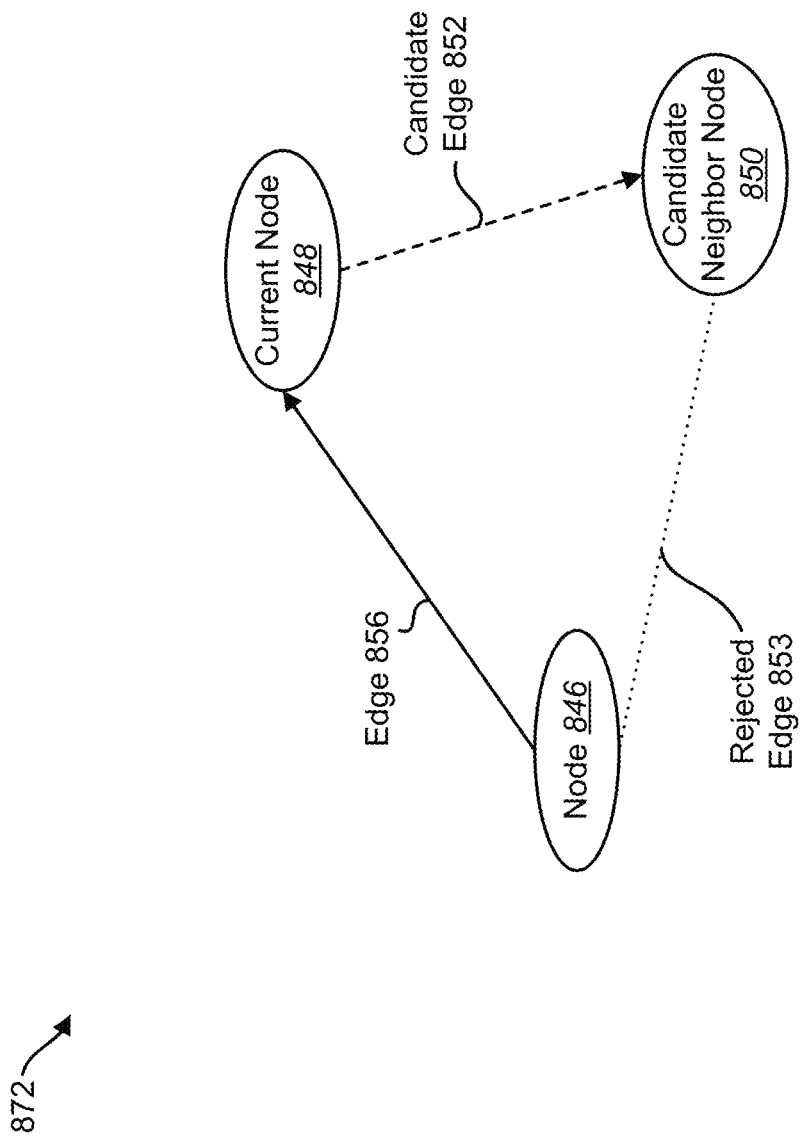
FIG. 8 provides another example of outlier edge rejection that may be performed in accordance with some configurations of the systems and methods disclosed herein.

FIG. 8 provides another example of outlier edge rejection that may be performed in accordance with some configurations of the systems and methods disclosed herein. In particular, FIG. 8 illustrates a node 846, a current node 848, and a candidate neighbor node 850 in a graph 872. The graph 872 also includes an edge 856 between the node 846 and the current node 848. A rejected edge 853 (e.g., a previously visited edge that was rejected) and a candidate edge 852 are also illustrated.

In some configurations of the systems and methods disclosed herein, an electronic device 102 may determine a similarity measure (e.g., $r_3$) between the current node 848 and the candidate neighbor node 850 in order to determine whether to accept or reject a candidate edge 852. An adaptive edge threshold may be used to accept or reject the candidate edge 852. The electronic device 102 may update the edge threshold based on accumulating similarity measures of one or more past edges 856 (e.g., accepted edge(s)), one or more past rejected edges 853, and/or the current candidate edge 852.

Some configurations of the systems and methods (e.g., algorithms) disclosed herein may provide one or more of the following advantages and/or benefits. One or more edges may be incrementally updated. Some configurations may be implemented for online and/or offline refining (e.g., bundle adjustment). The memory and time complexity for each update is O(1) in some configurations, where O(1) denotes a constant complexity in big O notation. For example, some approaches may need only limited memory for storing a cumulative similarity measure, a number of edges visited, and/or an annealing term. For instance, only the cumulative similarity measure, the number of edges visited, and/or the annealing term may need to be stored from a previous iteration to perform the current iteration. No prior knowledge may be required. It should be noted that while the systems and methods disclosed herein may be implemented for graphs representing frames and/or poses, some configurations may be implemented for other graphs constructed based on similarity and/or dissimilarity.

In contrast with the approaches described in connection with FIGS. 6 and 7, some configurations of the systems and methods disclosed herein may offer one or more of the following benefits. In particular, some configurations may provide online, dynamic, and/or incremental approaches that do not require all of the data (e.g., frames, poses, etc.) to be obtained before pose refinement (e.g., bundle adjustment) may be performed. For example, some configurations may allow incremental calculation where additional data (e.g., frames, poses, nodes, etc.) may be incrementally added. Additionally or alternatively, some configurations may enable reduced resource usage (e.g., less computation complexity and/or less memory usage). For example, the amount of memory required for variables may be reduced. Additionally or alternatively, the computational complexity for an update may be O(1). This may help an electronic device 102 (e.g., computer, processor, etc.) to increase performance. Some configurations may also not require a predetermined (e.g., fixed) threshold.

Figure 9:
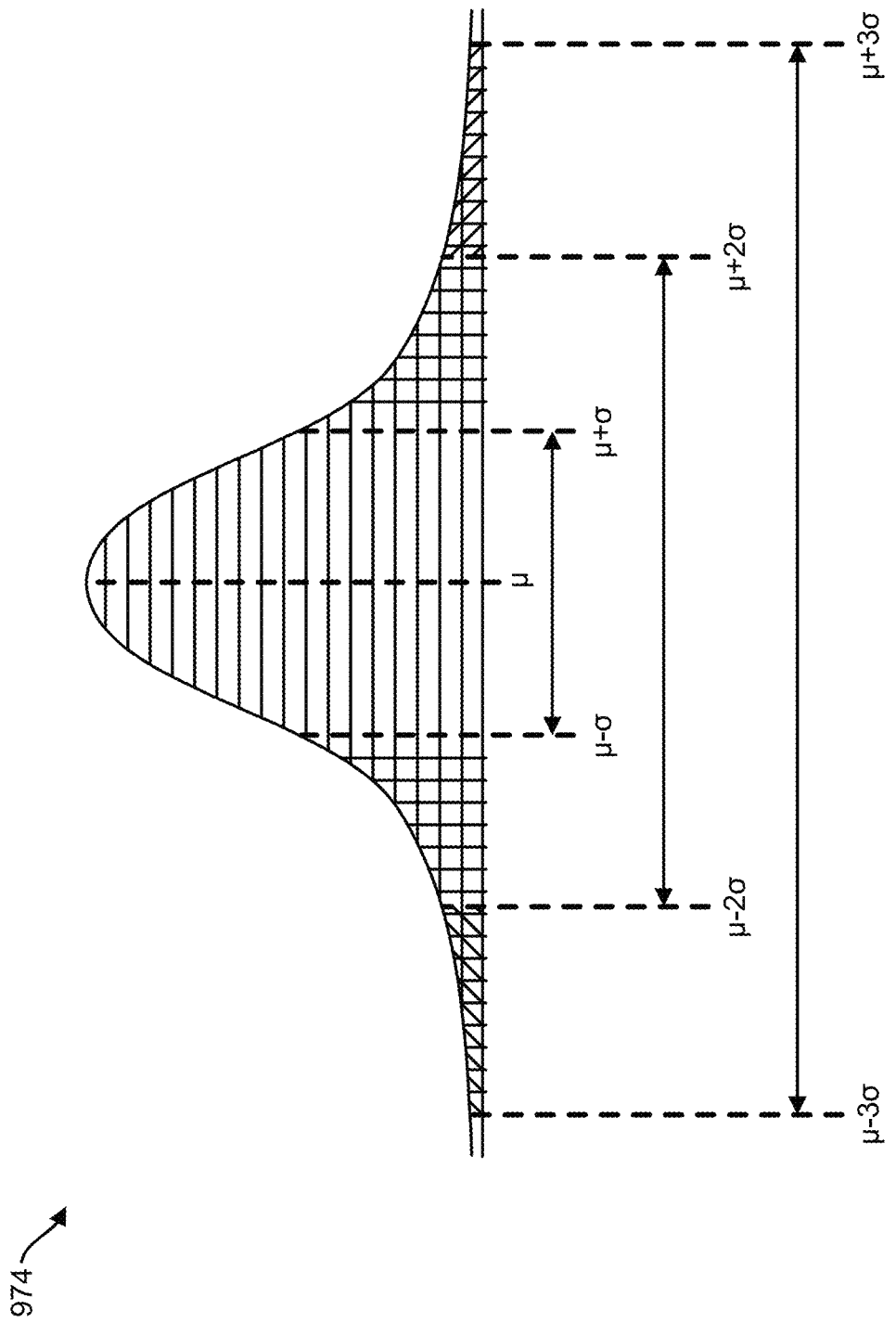
FIG. 9 is a diagram illustrating a Gaussian distribution.

FIG. 9 is a diagram illustrating a Gaussian distribution 974. In some configurations of the systems and methods disclosed herein, an incremental, data adaptive, outlier edge rejection approach may be utilized in graph construction. In some configurations, it may be assumed that the similarity measure is Gaussian distributed as shown in FIG. 9. Without loss of generality, the edge threshold may be defined as $th=\mu-s(2\sigma)$, where th is the edge threshold, $\mu$ is the mean of the Gaussian distribution 974, and $\sigma$ is the standard deviation of the Gaussian distribution 974. For example, approximately 68% of the data may lie within one standard deviation from the mean (e.g., between $\mu-\sigma$ and $\mu+\sigma$). Approximately 95% of the data may lie within two standard deviations from the mean (e.g., between $\mu-2\sigma$ and $\mu+2\sigma$). Approximately 99.7% of the data may lie within three standard deviations from the mean (e.g., between $\mu-3\sigma$ and $\mu+3\sigma$). For configurations that provide online graph construction, not all the data (e.g., frames, poses, etc.) may be available to calculate the mean and standard deviation at every time frame. It should also be noted that the noise contained in the data used for graph construction may vary over time.

Accordingly, some configurations may utilize a data adaptive incremental threshold $th_n=\mu_n-s_n(2\sigma_n)$, where n denotes an index of visited edges (including a current candidate edge, for example). For instance, n may be a number visited edges +1 (for the current candidate edge). Since the upper bound of the similarity measure $\mu+3\rho \approx 1$, the threshold may be expressed as $$th_n = \mu_n - s_n(2\sigma_n) = \mu_n - s_n \frac{2(1-\mu_n)}{3}.$$

For example, a mean-based term $$\left(e.g., \frac{2(1-\mu_n)}{3}\right)$$

may be utilized instead of a standard deviation-based term (e.g., $2\sigma_n$) to help increase convergence speed in some configurations. In some cases, one frame may be associated with multiple edges.

The convergence speed for an incremental mean may be faster than the convergence speed for the standard deviation. Accordingly, an estimated incremental standard deviation may be closer to the true standard deviation compared with the one directly calculated with the available data. In some configurations, the annealing term may be initialized as $s_1=1$. If a matching result is continuously not good, the threshold may quickly converge to the mean. If the matching result is good enough, the threshold may approximate the theoretical value $th=\mu-s(2\sigma)$. Accordingly, if $\mu_n-r_n>3\sigma_n=\mu_n-r_n>(1-\mu_n)$, which may mean that the current matching is bad, the annealing term may be set as $s_n=0.5s_{n-1}$. Otherwise, the annealing term may be set as $s_n=s_{n-1}$.

An alternative approach for determining the adaptive edge threshold is given as follows. Without using prior knowledge of the range of the distribution, the electronic device 102 may directly calculate an incremental standard deviation based on the available data (e.g., frames and/or poses, etc.). The electronic device 102 may determine a similarity measure $r_n$ for a current candidate edge. The similarity measure may be utilized to determine the adaptive threshold $th_n$ for the candidate edge. In this approach, the annealing term may be initialized to a value (e.g., $s_1=1$).

For the n-th candidate edge, the electronic device 102 may determine a cumulative similarity measure in accordance with one or more of Equations (2)-(3).

$$\Sigma r_n = \Sigma r_{n-1} + r_n \quad (2)$$

$$\Sigma r_n^2 = \Sigma r_{n-1}^2 + r_n^2 \quad (3)$$

The electronic device 102 may determine an incremental mean in accordance with Equation (1) above (i.e., $\mu_n=\Sigma r_n/n$).

The electronic device 102 may determine an incremental standard deviation in accordance with Equation (4).

$$\sigma_n = \sqrt{\frac{\Sigma r_n^2}{2} - \left(\frac{\Sigma r_n}{n}\right)^2} \quad (4)$$

Listing (3) illustrates an approach to determine the adaptive edge threshold $th_n$ (e.g., data adaptive threshold) based on the incremental mean, the incremental standard deviation, and the annealing term. For example, the electronic device 102 may determine the adaptive edge threshold in accordance with Listing (3) instead of Listing (1) in some configurations.

```
if μ_n - r_n > 3σ_n then
    s_n = 0.5s_{n-1};
else
    s_n = s_{n-1};
end
th_n = μ_n - s_n (2σ_n);
    Listing (3)
```

The electronic device 102 may determine whether to accept or reject the candidate edge based on the adaptive edge threshold. For example, the electronic device 102 may accept or reject the candidate edge based on the adaptive edge threshold in accordance with Listing (2) in some configurations.

Figure 10:
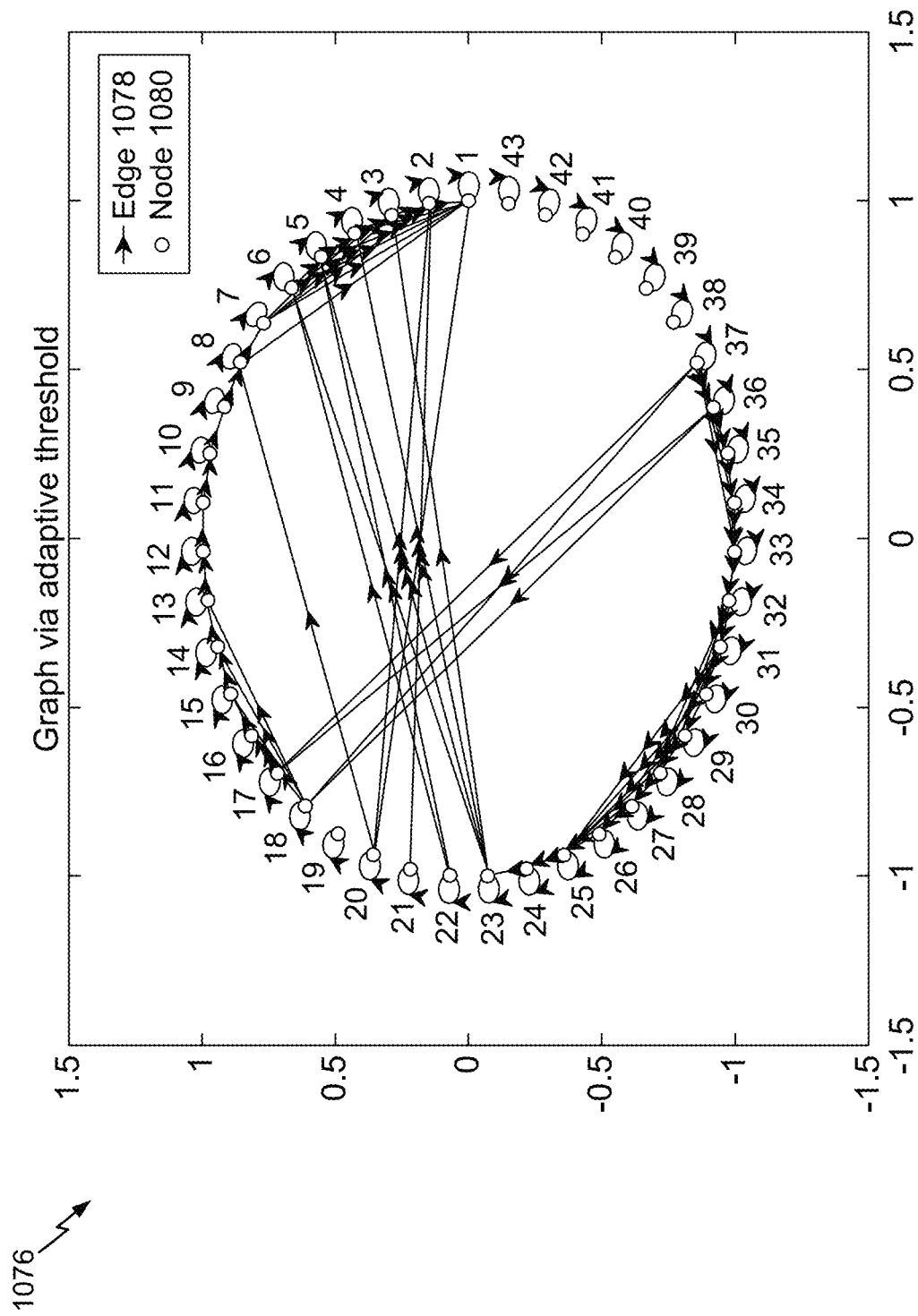
FIG. 10 is a plot of a graph with edges determined with an adaptive edge threshold.

FIG. 10 is a plot 1076 of a graph with edges 1078 determined with an adaptive edge threshold. Specifically, FIG. 10 illustrates an example of an approach where an adaptive edge threshold is used. In this approach, an adaptive edge threshold is utilized to accept or reject candidate edges between nodes 1080. For example, an outlier threshold may be determined in accordance with the systems and methods disclosed herein. One advantage of this approach is that the adaptive threshold may perform well based on the data, since similarity between nodes is data-dependent and may vary. For example, the edges 1078 illustrated in FIG. 10 may be more accurate than the edges 766 described in connection with FIG. 7. For ease of illustration, the plot 1076 illustrates the nodes 1080 in a circle varying from −1 to 1 on both horizontal and vertical axes.

Figure 11:
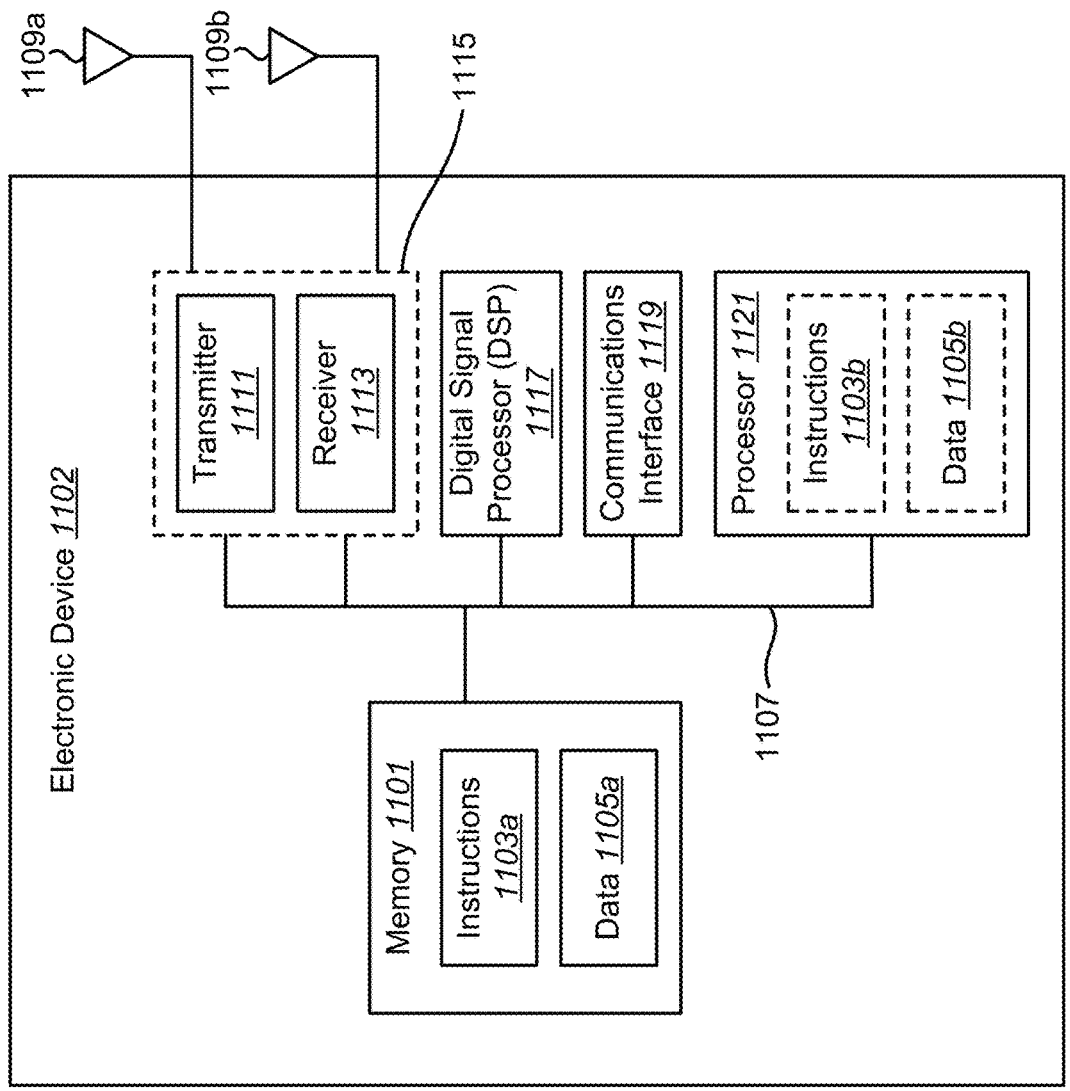
FIG. 11 illustrates certain components that may be included within an electronic device configured to implement various configurations of the systems and methods disclosed herein.

FIG. 11 illustrates certain components that may be included within an electronic device 1102 configured to implement various configurations of the systems and methods disclosed herein. Examples of the electronic device 1102 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, mounted cameras, connected cameras, robots, aircraft, drones, unmanned aerial vehicles (UAVs), gaming consoles, personal digital assistants (PDAs), etc. The electronic device 1102 may be implemented in accordance with one or more of the electronic devices described herein.

The electronic device 1102 includes a processor 1121. The processor 1121 may be a general purpose single- or multi-chip microprocessor (e.g., an ARM), a special purpose microprocessor (e.g., a digital signal processor (DSP)), a microcontroller, a programmable gate array, etc. The processor 1121 may be referred to as a central processing unit (CPU). Although just a single processor 1121 is shown in the electronic device 1102, in an alternative configuration, a combination of processors (e.g., an ARM and DSP) could be implemented.

The electronic device 1102 also includes memory 1101. The memory 1101 may be any electronic component capable of storing electronic information. The memory 1101 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1105a and instructions 1103a may be stored in the memory 1101. The instructions 1103a may be executable by the processor 1121 to implement one or more of the methods, procedures, steps, and/or functions described herein. Executing the instructions 1103a may involve the use of the data 1105a that is stored in the memory 1101. When the processor 1121 executes the instructions 1103, various portions of the instructions 1103b may be loaded onto the processor 1121 and/or various pieces of data 1105b may be loaded onto the processor 1121.

The electronic device 1102 may also include a transmitter 1111 and/or a receiver 1113 to allow transmission and reception of signals to and from the electronic device 1102. The transmitter 1111 and receiver 1113 may be collectively referred to as a transceiver 1115. One or more antennas 1109a-b may be electrically coupled to the transceiver 1115. The electronic device 1102 may also include (not shown)

multiple transmitters, multiple receivers, multiple transceivers and/or additional antennas.

The electronic device 1102 may include a digital signal processor (DSP) 1117. The electronic device 1102 may also include a communications interface 1119. The communications interface 1119 may allow and/or enable one or more kinds of input and/or output. For example, the communications interface 1119 may include one or more ports and/or communication devices for linking other devices to the electronic device 1102. In some configurations, the communications interface 1119 may include the transmitter 1111, the receiver 1113, or both (e.g., the transceiver 1115). Additionally or alternatively, the communications interface 1119 may include one or more other interfaces (e.g., touchscreen, keypad, keyboard, microphone, camera, etc.). For example, the communication interface 1119 may enable a user to interact with the electronic device 1102.

The various components of the electronic device 1102 may be coupled together by one or more buses, which may include a power bus, a control signal bus, a status signal bus, a data bus, etc. For the sake of clarity, the various buses are illustrated in FIG. 11 as a bus system 1107.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps and/or actions may be added to the method(s) and/or omitted from the method(s) in some configurations of the systems and methods disclosed herein.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and electronic device described herein without departing from the scope of the claims.

What is claimed is:

1. A method performed by an electronic device, comprising:
   incrementally adding a current node to a graph;
   determining a respective similarity measure between the current node and one or more candidate neighbor nodes;
   incrementally determining a respective adaptive edge threshold based on the respective similarity measure for a candidate edge between the current node and the one or more candidate neighbor nodes;
   determining whether to accept or reject the candidate edge based on the respective adaptive edge threshold;
   performing refining based on the graph to produce refined data; and
   producing a three-dimensional (3D) model based on the refined data.

2. The method of claim 1, wherein determining the adaptive edge threshold is based on a cumulative similarity measure of one or more similarity measures.

3. The method of claim 1, wherein determining whether to accept or reject the candidate edge comprises:
   accepting the candidate edge in a case that the respective similarity measure is greater than or equal to the respective adaptive edge threshold; and
   rejecting the candidate edge in a case that the respective similarity measure is less than the respective adaptive edge threshold.

4. The method of claim 3, wherein accepting the candidate edge comprises associating the current node with a candidate neighbor node using the candidate edge.

5. The method of claim 1, wherein determining the adaptive edge threshold comprises:
   determining an incremental mean based on a cumulative similarity measure;
   determining an annealing term based on the incremental mean and the respective similarity measure; and
   determining the adaptive edge threshold based on the incremental mean and the annealing term.

6. The method of claim 5, further comprising determining an incremental standard deviation, and wherein determining the adaptive edge threshold is further based on the incremental standard deviation.

7. The method of claim 1, further comprising incrementally obtaining key frames, wherein each of the key frames has an associated three-dimensional (3D) pose, and wherein each of the current node and the one or more candidate neighbor nodes corresponds to one of the key frames with the associated 3D pose.

8. The method of claim 1, wherein producing the 3D model comprises utilizing multiple image frames to produce a mesh model based on the refined data.

9. An electronic device, comprising:
   a memory;
   a processor coupled to the memory, wherein the processor is configured to:
      incrementally add a current node to a graph;
      determine a respective similarity measure between the current node and one or more candidate neighbor nodes;
      incrementally determine a respective adaptive edge threshold based on the respective similarity measure for a candidate edge between the current node and the one or more candidate neighbor nodes;
      determine whether to accept or reject the candidate edge based on the respective adaptive edge threshold;
      perform refining based on the graph to produce refined data; and
      produce a three-dimensional (3D) model based on the refined data.

10. The electronic device of claim 9, wherein the processor is configured to determine the adaptive edge threshold based on a cumulative similarity measure of one or more similarity measures.

11. The electronic device of claim 9, wherein the processor is configured to determine whether to accept or reject the candidate edge by:
   accepting the candidate edge in a case that the respective similarity measure is greater than or equal to the respective adaptive edge threshold; and
   rejecting the candidate edge in a case that the respective similarity measure is less than the respective adaptive edge threshold.

12. The electronic device of claim 11, wherein the processor is configured to accept the candidate edge by associating the current node with a candidate neighbor node using the candidate edge.

13. The electronic device of claim 9, wherein the processor is configured to determine the adaptive edge threshold by:
   determining an incremental mean based on a cumulative similarity measure;
   determining an annealing term based on the incremental mean and the respective similarity measure; and
   determining the adaptive edge threshold based on the incremental mean and the annealing term.

14. The electronic device of claim 13, wherein the processor is configured to determine an incremental standard deviation, and wherein the processor is configured to determine the adaptive edge threshold further based on the incremental standard deviation.

15. The electronic device of claim 9, wherein the processor is configured to incrementally obtain key frames, wherein each of the key frames has an associated three-dimensional (3D) pose, and wherein each of the current node and the one or more candidate neighbor nodes corresponds to one of the key frames with the associated 3D pose.

16. The electronic device of claim 9, wherein the processor is configured to produce the 3D model by utilizing multiple image frames to produce a mesh model based on the refined data.

17. A non-transitory tangible computer-readable medium storing computer executable code, comprising:
   code for causing an electronic device to incrementally add a current node to a graph;

code for causing the electronic device to determine a respective similarity measure between the current node and one or more candidate neighbor nodes;

code for causing the electronic device to incrementally determine a respective adaptive edge threshold based on the respective similarity measure for a candidate edge between the current node and the one or more candidate neighbor nodes;

code for causing the electronic device to determine whether to accept or reject the candidate edge based on the respective adaptive edge threshold;

code for causing the electronic device to perform refining based on the graph to produce refined data; and code for causing the electronic device to produce a three-dimensional (3D) model based on the refined data.

18. The computer-readable medium of claim 17, further comprising code for causing the electronic device to determine the adaptive edge threshold based on a cumulative similarity measure of one or more similarity measures.

19. The computer-readable medium of claim 17, wherein the code for causing the electronic device to determine whether to accept or reject the candidate edge comprises:

code for causing the electronic device to accept the candidate edge in a case that the respective similarity measure is greater than or equal to the respective adaptive edge threshold; and code for causing the electronic device to reject the candidate edge in a case that the respective similarity measure is less than the respective adaptive edge threshold.

20. The computer-readable medium of claim 17, wherein the code for causing the electronic device to determine the adaptive edge threshold comprises:

code for causing the electronic device to determine an incremental mean based on a cumulative similarity measure;

code for causing the electronic device to determine an annealing term based on the incremental mean and the respective similarity measure; and code for causing the electronic device to determine the adaptive edge threshold based on the incremental mean and the annealing term.

21. The computer-readable medium of claim 17, further comprising code for causing the electronic device to produce the 3D model by utilizing multiple image frames to produce a mesh model based on the refined data.

22. An apparatus, comprising:

means for incrementally adding a current node to a graph;

means for determining a respective similarity measure between the current node and one or more candidate neighbor nodes;

means for incrementally determining a respective adaptive edge threshold based on the respective similarity measure for a candidate edge between the current node and the one or more candidate neighbor nodes;

means for determining whether to accept or reject the candidate edge based on the respective adaptive edge threshold;

means for performing refining based on the graph to produce refined data; and means for producing a three-dimensional (3D) model based on the refined data.

23. The apparatus of claim 22, wherein the means for determining the adaptive edge threshold is based on a cumulative similarity measure of one or more similarity measures.

24. The apparatus of claim 22, wherein the means for determining whether to accept or reject the candidate edge comprises:

means for accepting the candidate edge in a case that the respective similarity measure is greater than or equal to the respective adaptive edge threshold; and means for rejecting the candidate edge in a case that the respective similarity measure is less than the respective adaptive edge threshold.

25. The apparatus of claim 22, wherein the means for determining the adaptive edge threshold comprises:

means for determining an incremental mean based on a cumulative similarity measure;

means for determining an annealing term based on the incremental mean and the respective similarity measure; and means for determining the adaptive edge threshold based on the incremental mean and the annealing term.

26. The apparatus of claim 22, further comprising means for producing the 3D model by utilizing multiple image frames to produce a mesh model based on the refined data.

* * * * *